Patented Sept. 29, 1931

1,825,199

UNITED STATES PATENT OFFICE

JOSÉ A. PATIÑO, PARAMUS, NEW JERSEY

PROCESS OF WATERPROOFING

No Drawing.    Application filed March 17, 1928.    Serial No. 262,599.

My invention consists in a new and useful improvement in process of waterproofing, and is designed more particularly for rendering cement surfaces and joints, breaks, cracks, etc. in same, impervious to moisture, but my improvement has many applications and can be adapted for a variety of uses, and it is to be distinctly understood that I do not consider my invention limited to the specific embodiments herein described but refer for its scope to the claims appended hereto.

It is well known and understood in the art that cement surfaces when subjected to water pressure, or even to the effect of moisture are not impervious thereto, and it becomes necessary in such cases to subject the surface to treatment to render it waterproof. By means of numerous experimental tests and considerable actual experience in the treatment of cement surfaces, I have found that the practice of my improved process renders the surface impervious to moisture.

In its simplest form my improved process consists in producing a liquid composition of iron filings, sal-ammoniac and water, and applying same in the form of a thin coating upon the cement surface to be treated, and then applying a thin coating of cement upon the coating of the composition. I may vary this process by applying an intermediate coating of a composition consisting of the above-described composition in combination with a small proportion of cement. Another application of my improvement is the treatment of joints of a cement surface with metal pipes or rods passing therethrough. To render such joints waterproof, I apply a coating of my improved composition to the cement surrounding the joint and then apply a second coating composed of a mixture of my composition with cement. Substantially similar treatment can be used, with oakum calking, to waterproof pipe joints.

I have found that my improved process is very effective for repairing breaks or cracks in cement surfaces. I treat the edges of the opening by applying a coating of my composition, and then fill the crack with a mixture of my composition and cement, using oakum or other calking material if the opening is of any considerable size.

I have also found that my process is equally effective for waterproofing joints, cracks or breaks in metal surfaces.

Many experiments in the treatment of glass surfaces have shown that by the use of my improved process cement can be caused to adhere to glass surfaces in such a manner as to effect a waterproof joint.

I have found that my process can be practiced by making a dry composition of iron filings and sal-ammoniac, and mixing same with cement in a dry state, and using the resulting mixture for coating surfaces or filling openings, and I can also produce a liquid mixture, as above described, composed of iron filings, sal-ammoniac and water to be used either alone as a liquid covering, or in combination with a quantity of cement added thereto.

Having described my invention, what I claim is:

1. The process of waterproofing surfaces which consists in applying thereto a liquid coating composed of iron filings, sal-ammoniac and water, and covering said second liquid coating with a coating of cement mixed with the ingredients of said first coating.

2. The process of waterproofing joints, breaks and cracks in surfaces by applying to the walls of the surface adjacent the opening a liquid coating composed of iron filings, sal-ammoniac and water, and filling the opening with a composition comprising the ingredients of said coating mixed with cement.

3. The process of waterproofing surfaces which consists in creating upon said surfaces a waterproof membrane formed by iron filings affected by wetted sal-ammoniac, and covering said membrane with a coating of cement mixed with said affected filings.

In testimony whereof I affix my signature.

JOSÉ A. PATIÑO.